US010990606B2

(12) United States Patent
Bertellotti et al.

(10) Patent No.: US 10,990,606 B2
(45) Date of Patent: Apr. 27, 2021

(54) DATABASE SEARCH SYSTEM AND METHOD

(71) Applicant: Nuovo Pignone Tecnologie Srl, Florence (IT)

(72) Inventors: Fabio Bertellotti, Florence (IT); Andrea Farini, Pontassieve (IT); Arturo Battinelli, Florence (IT); Daniele Alderighi, Empoli (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 158 days.

(21) Appl. No.: 16/004,138

(22) Filed: Jun. 8, 2018

(65) Prior Publication Data

US 2019/0026318 A1 Jan. 24, 2019

(30) Foreign Application Priority Data

Jul. 19, 2017 (IT) .................. 102017000082320

(51) Int. Cl.
*G06F 16/00* (2019.01)
*G06F 16/27* (2019.01)
(Continued)

(52) U.S. Cl.
CPC ............ *G06F 16/27* (2019.01); *G06F 16/243* (2019.01); *G06F 16/248* (2019.01); *G06F 16/24534* (2019.01); *G06F 16/256* (2019.01)

(58) Field of Classification Search
CPC ............. G06F 16/243; G06F 16/24534; G06F 16/248; G06F 16/256; G06F 16/27
(Continued)

(56) References Cited

U.S. PATENT DOCUMENTS 6,070,160 A 5/2000 Geary
7,822,768 B2 * 10/2010 Maymir-Ducharme ................
G06F 16/313
707/776

(Continued)

FOREIGN PATENT DOCUMENTS

EP 2 778 987 A1 9/2014

OTHER PUBLICATIONS

Italian Search Report and Opinion issued in connection with corresponding IT Application No. 102017000082320 dated Mar. 9, 2018.

(Continued)

*Primary Examiner* — Michelle N Owyang
(74) *Attorney, Agent, or Firm* — Baker Hughes Patent Org.; Marc A. Vivenzio

(57) ABSTRACT

Methods and systems for searching multiple databases are presented. Search connectors are defined between a first and second database, including a search connector having a shared field of the first and second database. Edge connections are generated between the first and second database using the search connector. Each of the edge connections include one or more instances of the shared field in the first and second database. A search query is received from a user interface. The search query is mapped to one of the plurality of search connectors having a specific shared field. A specific instance of the specific shared field is returned, and may be one of the edge connections between the first and second database. In another example, a natural language search query is received, and is translated using the defined search connectors. In a further example, data corresponding to the view name is imported.

16 Claims, 9 Drawing Sheets

(51) Int. Cl.
  *G06F 16/242* (2019.01)
  *G06F 16/25* (2019.01)
  *G06F 16/2453* (2019.01)
  *G06F 16/248* (2019.01)

(58) Field of Classification Search
  USPC .................................................. 707/705–780
  See application file for complete search history.

(56) References Cited

U.S. PATENT DOCUMENTS

| | | | |
|---|---|---|---|
| 8,296,317 B2* | 10/2012 | Ghosh | G06F 16/00 |
| | | | 707/769 |
| 9,619,511 B2* | 4/2017 | Mathew | G06F 16/242 |
| 10,303,683 B2* | 5/2019 | Anderson | G06F 16/24522 |
| 2005/0278308 A1 | 12/2005 | Barstow | |
| 2008/0162622 A1* | 7/2008 | Becker | G06F 16/25 |
| | | | 709/201 |
| 2010/0235390 A1* | 9/2010 | Sano | G06F 16/902 |
| | | | 707/770 |
| 2014/0282901 A1* | 9/2014 | Dwan | H04L 67/22 |
| | | | 726/4 |
| 2018/0039671 A1* | 2/2018 | Yang | G06F 16/256 |

OTHER PUBLICATIONS

Extended European Search Report and Opinion issued in connection with corresponding EP Application No. 18183903.6 dated Oct. 15, 2018.

* cited by examiner

| CONCATENATE (NUMBER-RELEASE-LINE-SHIPMENT) | SUPPLIER NAME | ITEM | PRODUCT CODE | ITEM DESCRIPTION | RECEIPT DATE VS NEED DATE | TEAM LEADER | SPA NAME | PROJECT | SUPPLIER DELIVERY DATE VS CONTRACTUAL |
|---|---|---|---|---|---|---|---|---|---|
| 439935445--4-1 | ACME MACHINERY CO LTD | SWA5896400 | R1382 | DIAFRAMMA DI MANDATA FUSO MOD90626 | 26 | PAOLO | JEFF | 2842633 | 107 |
| 439935445--2-1 | ACME MACHINERY CO LTD | SWA971458602 | R1382 | INJECTION DIAPHRAGM CE/CO MCL455 - FUSIONLOWER PART | 72 | PAOLO | JEFF | 1103229 | 89 |
| 439935445--1-1 | ACME MACHINERY CO LTD | SWA971458601 | R1382 | INJECTION DIAPHRAGM CE/CO MCL455 - FUSIONUPPER PART | 72 | PAOLO | JEFF | 1103229 | 89 |
| 439935445--3-1 | ACME MACHINERY CO LTD | SWA6537900 | R1382 | OUTLET DIAPHRAGM CE/CO MCL455 - FUSION | 51 | PAOLO | JEFF | 1103229 | 68 |

| | | | | | | | |
|---|---|---|---|---|---|---|---|
| BY AREA ⟩ 1 TMS/DTS ⟩ SOURCING ⟩ SOURCING QUALITY ⟩ SUPPLIER DEVIATIONS REQUESTS (OLD) ⟩ | | | | | | | |
| PO NUM: 439935445 ⊗ | | | | | | SEARCH | |
| VIEW: SEARCH LIKE ∨ TABULAR  EXPLORATION VIEW | | | | | | | |
| ADVANCED SEARCH | | | | | | | |
| NUMBERS OF RESULTS FOUND : 3 — 611 | | | | | | TOOGLE PIVOT SHOW / HIDE — 617 — 618 | |
| DEVIATION DESC | SDR ID 612 | COMPONENT DESC 613 | QUALITY SIGN DATE 614 | PRIMARY SQE NAME 615 | SUPPLIER NAME 616 | NCR NUMBER | CLOSED BY |
| SDR ROUTED TO:TANG RELEVANT TO THE QUEUE SQ ⟩⟩ | 23494 | OUTLET DIAPHRAGM CE/CO MCL455 - FUSION | 2014-08-05 | TANG | ACME MACHINERY CO LTD | 7444088 — 631 | TANG — 632 |
| SDR ROUTED TO:TANG RELEVANT TO THE QUEUE SQ ⟩⟩ | 24793 | DIAFRAMMA DI MANDATA FUSO MOD90626 | 2014-11-03 | TANG | ACME MACHINERY CO LTD | NULL | TANG — 633 |
| SDR ROUTED TO:PICCHI, MARCO RELEVANT TO THE QUE ⟩⟩ | 23685 | INJECTION DIAPHRAGM CE/CO MCL455 - FUSIONLOWER PART | 2014-09-02 | TANG | ACME MACHINERY CO LTD | NULL | TANG — 634 |

| | INITIATED_DATE | DEVIATION_DESCRIPTION | DEVCODE | PART_NO | PART_ID | PROJECT_NO | SUPPLIER_NAME |
|---|---|---|---|---|---|---|---|
| F1444088 | 2014-09-02 | LEONARDO-30-01-2015 - BECA>> | CO19-COSMETIC/DAMAGED - CLEANLINESS | SWA653 7900 | OUTLET DIAPHRAGM CE /CO MCL455 - FUSION | 1103229 | ACME MACHINERY CO LTD |
| F1444088 | 2014-09-02 | | | 00 | OUTLET DIAPHRAGM CE /CO MCL455 - FUSION | 1103229 | ACME MACHINERY CO LTD |
| F1444088 | 2014-09-02 | | | 00 | OUTLET DIAPHRAGM CE /CO MCL455 - FUSION | 1103229 | ACME MACHINERY CO LTD |

Tooltip (840): LEONARDO-30-01-2015 - BECAUSE OF AN EDITING ERROR WAS INSERTED THE WRONG SERIAL NUMBER THE RIGHT ON IS THE 540950~*~ LEONARDO -30-01-2015 - SELECTED SERIAL NUMBERS: 540950~*~ LEONARDO -30-01-2015 - SELECTED SERIAL NUMBERS: 540901A~*~ LEONARDO -02-09-2014 - SERIAL NUMBERS: 540901A~*~ LEONARDO -02-09-2014 - SDR ROUTED TO : TANG RELEVENT TO QUEUE MPE~*~TANG - 02-09-2014 - SDR ROUTED TO: ANDREA

FIG. 8

DATABASE SEARCH SYSTEM AND METHOD

BACKGROUND OF THE INVENTION

The subject matter disclosed herein relates to databases and searching systems, and more particularly to methods and systems for searching multiple disparate databases. Many industries rely upon complex supply chains, in which multiple, independent parties participate. These supply chain participants typically each maintain their own databases and affiliated systems in order to track information about products, services, manufacturing, reliability, testing, and other details related to various items such as deployed products and services. Because of the proprietary nature of the information, each participant does not typically reveal all data to other participants. However, to the extent that certain participants have partnered with one another, there may be a desire to share some of the data related to their common interests.

In one example, physical products may be manufactured, sold, installed, deployed, and serviced by different entities. In order to facilitate lifecycle management of such physical products, the entities may share data through bulk downloads of raw data, password access to multiple different systems, or other offline, non-integrated means. Such techniques do not allow for real-time mining of the data, and instead store information, such as engineering drawings, specification, transaction data, etc., in various disparate IT systems, making search and retrieval difficult. Therefore, a need exists for techniques to improve process efficiency in such multi-vendor systems.

SUMMARY

Methods and systems for searching multiple databases are presented. For instance, search connectors are defined between a first database and a second database, including one search connector having a shared field of the first database and the second database. Edge connections are generated between the first database and the second database using the one search connector. Each of the edge connections include one or more instances of the shared field in the first database and the second database. A search query is received from a user interface. The search query is mapped to one of the plurality of search connectors having a specific shared field. A specific instance of the specific shared field is returned. An advantage that may be realized in the practice of some disclosed embodiments of the method or system is that multiple different databases may be readily searched by non-expert operators.

In one example, a natural language search query is received, and the natural language search query is translated using the defined search connectors. In another example, data corresponding to the view name is imported. In a further example, one of the first database and the second database comprises a standard query language (SQL) database.

The above embodiments are exemplary only. Other embodiments are within the scope of the disclosed subject matter.

BRIEF DESCRIPTION OF THE DRAWINGS

So that the manner in which the features of embodiments of the invention can be understood, a detailed description of embodiments of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

FIGS. 4-8 depict graphical user interfaces; and

DETAILED DESCRIPTION

Figure 1:
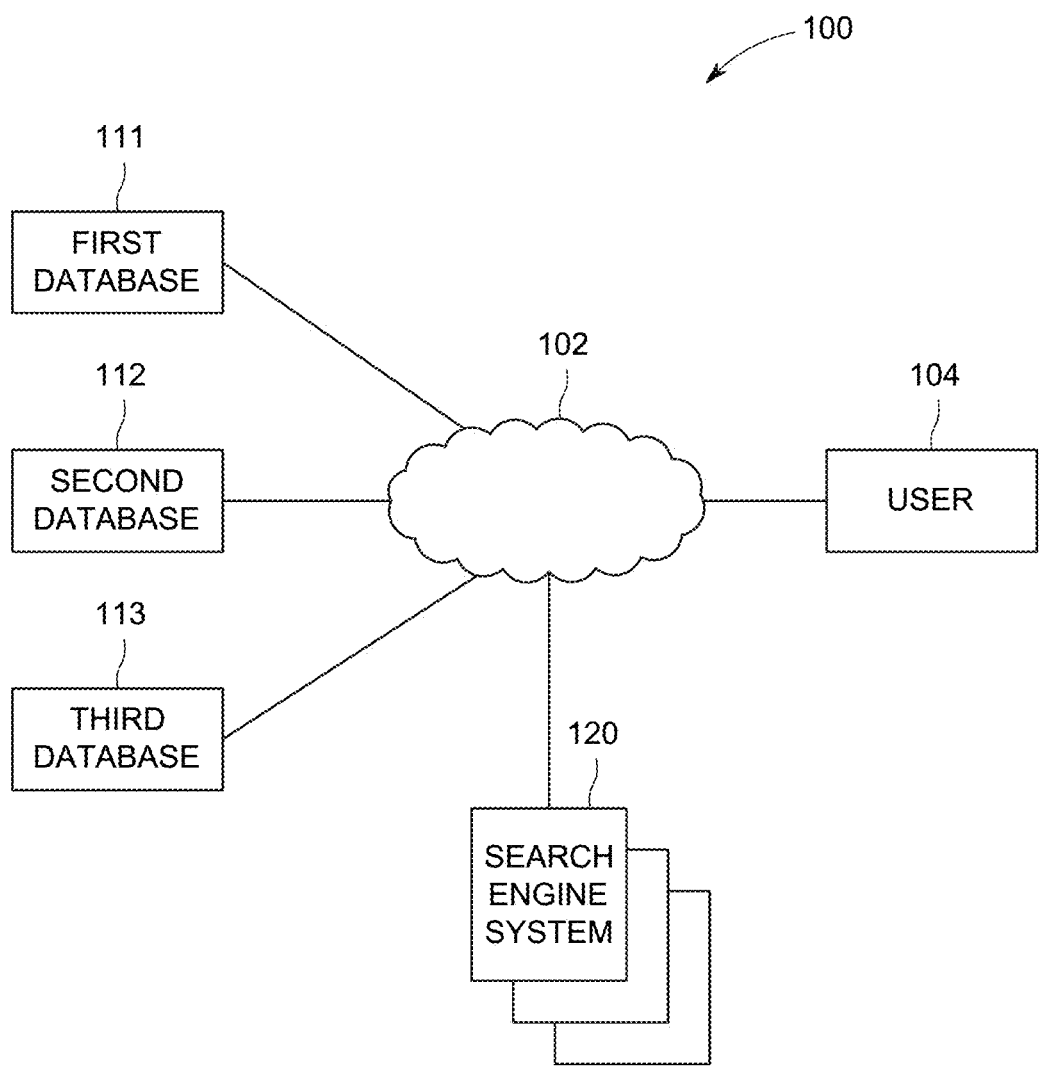
FIG. 1 is a diagram of an example database search system.

Embodiments of the disclosed subject matter provide techniques for searching multiple databases of different technology types by allowing for search connectors to be defined that connect the multiple databases through shared fields to find related information across the databases. For example, the defined search connectors can be used to generate edge connections, which may represent database tables that have the information that is related within the meaning of the search connectors. Continuing with this example, the search connectors may be defined, and the edge connection data generated (or gathered) by an expert user, and the connectors and connections between the data may then be used by other non-expert users, allowing searching in a simplified manner. For example, simple natural language queries may be used by the non-expert users, where the simplified queries are confined to searching through the previously defined search connectors. Because the non-expert users do not have to define the search connectors, these users can gain the benefits of simplified searching once the connectors have been defined and used by the expert users. Other embodiments are within the scope of the disclosed subject matter. As an advantage, the methods and systems disclosed herein allow for quickly and easily searching multiple databases, without having to construct complex queries each time a search is required. By contrast, conventional systems require the use of complex database queries to search a database.

The present disclosure relates, in part, to methods of integrating numerous, disparate databases that have a certain degree of overlap within the data structures that are stored within the databases. In an embodiment, these techniques allow, for example, natural language queries to be made by a non-expert user, to search the multiple databases at once, and provide search results that include a linkage of the data across the multiple databases. By way of overview, an expert may first configure the system with a predefined set of connectors that establish a set of searching templates that allow a non-expert user to conduct a simplified natural language query, similar to a search query used by search engines such as the Google search engine, provided by Google of Mountain View, Calif., USA. As one advantage, the present technique allows for simple natural language querying to return results that are connected across multiple databases. As another advantage, the techniques disclosed herein allow for searching and navigation of data across business entities, rather than across application names and acronyms. For example, establishing a business taxonomy allows for business aspects of various systems to be identified clearly. In one specific example, a taxonomy may include concepts such as purchase orders stored in an Oracle database, drawings stored in an electronic document management (EDM) database, and issues stored in a non-conformance reporting (NCR) database.

For instance, definition of the search connectors may include the specification of a graph of business entities, e.g., a set of business entities annotated with a set of connections linking some entities to other entities. The connections may represent business links, such as purchases, sales, installations, servicing, etc. Connections may be in the form of physical connections, such as through connected networks, linking together disparate data sets or databases.

In addition, the search connectors may be specified in accordance with a business taxonomy that organizes data according to business processes or logistics information. In one example, once the search connectors are defined, e.g., in terms of a business taxonomy, a set of all connections affiliating the elements of the business taxonomy with the business entities may be algorithmically be created, representing edge connections between the business entities labeled with business process or logic.

In an embodiment, the created connections and graphs may be navigated or viewed through a user interface to provide a free-form navigation interface to other non-expert users (e.g., users other than the users who created the search connectors and/or defined the business taxonomy). By contrast, flat file or traditional structure query language (SQL) databases only would allow access to one database at a time, and lack the ability to navigate freely across the multiple business entities and/or physical databases in the system.

Further advantages may be realized from a database search system, as described herein, based on defined search connectors and algorithmic connections created from business taxonomies. For example, separation of the data modeling from the data searching allows an upfront process of search connector creation to be performed one time or by one set of users, allowing for a cleaned up model. Thus, an expert user may predefine certain searches, allowing ease of use by non-expert users when searching the specified datasets. By allowing the creation of the connectors to control the creation of the connections, the business context is maintained, and irrelevant or noisy search results are reduced or eliminated.

After the upfront modeling, all users may make use of the created structure to create intelligent queries with results that are similar to reports, but offering access to data across the multiple business entities. In such a case, even free searching or keyword searching may be used to search the created view, rather than creating complex structured queries or business intelligence filters.

In addition, the system allows for flexibly adding new data sources. Once configured, as described below, the data source will be available for searches, such as keyword searches, etc.

FIG. 1 is a diagram of a network infrastructure 100 including an example database search system 120. In one example, a number of databases, such as a first database 111, a second database 112, and a third database 113, may be connected via a network 102 (such as a cloud infrastructure or a private network), to the search engine system 120. A number of users, such as a user 104, may log into the search engine system 120 to conduct various searches, as described herein.

The database search system 120 may operate on one or more computers, and may include a database system with a permanent storage mechanism, for storing configuration files, search connectors, results, and other information described with respect to the techniques set forth herein. In addition, the database search system 120 may include one or more internet or other network based servers for receiving queries from various users of the system 120. A distributed model may be employed in which the database search system 120 may include multiple computer servers, with affiliated memories and non-volatile storage devices, may be deployed in multiple geographic locations.

In addition, the database search system 120 may itself include a relational database, an object-oriented database, a flat file system, or any other system for organizing data. The database search system 120 may be connected to a private or public network, and may include connectivity to any or all of the databases 111-113, so that those databases may be queried. Configuration of the database search system 120 may be included, so that multiple users, with different levels of access, may be allowed to access the system. For example, the database search system 120 may include a network based graphical user interface that allows users to log in and define searches and search connectors, configure databases for searching as described herein, etc.

In one example, the databases 111-113 may be based on different underlying technologies. For example, the first database 111 may be an SQL (standard query language) database, the second database 112 may be a proprietary corporate database, and the third database 113 may be a business object data source available from SAP AG, of Germany. In other examples, numerous different proprietary databases may be integrated into the system 120 through the use of application programming interfaces (APIs) that define the querying interface to the databases.

As may be readily understood by one having skill in database technology, each of the underlying databases 111-113, regardless of the vendor technology, are used to organize data records into a data schema. Thus, data may be organized as tables, views, XML tags, object-oriented objects, etc. Fundamentally, all these methods of organizing data include the concept of, for example, a field, which may define a characteristic of a data record, such as a part identifier, geographical location, etc. To the extent that multiple different databases 111-113 include data records with a common, shared field identifier, there is a linkage between that data, and a subsequent lookup based on that shared field in each of the databases 111-113 will yield different data about the same topic.

For example, one of the databases 111-113 may be a manufacturing database that is co-located at a manufacturing facility, and may include information that is used to track raw material inventory, finished goods, work orders, manufacturing inspection records (including defect information) and other information related to receiving raw materials from suppliers and preparing finished goods. In this example, the manufacturing database may be a commercial database system that has been customized to support a manufacturers business model, including inventory management, billing management, order entry, customer support, and other such services.

In another example, one of the databases 111-113 may be a vendor database that is operated by a vendor such as a value added reseller or systems integrator. In such a case, the vendor database may also include supply chain features, such as purchase order entry, billing, etc., in addition to tracking of work in progress, customer details, order and shipment details, etc.

In a further example, one of the databases 111-113 may be a customer database that is operated by a customer, and includes details regarding the customers purchases, status information of equipment at a plant, or other information.

In the examples set forth above regarding databases 111-113, notably a single virtual or physical item, such as a machine or finished good, may be related to numerous entries in one or more of the databases 111-113. In an embodiment, by allowing an expert user to define a search connector based on an analysis of the various data tables located in the different databases 111-113, these underlying connections may be identified, such that all the information related to a single item may be related together and searchable. For instance, in the lifecycle of a complex manufactured item, the item may pass through the control of various businesses or business entities for various purposes or functions. These functions may include manufacturing, delivery, installation, calibration, operations repair, etc. During the performance of each function, the various business entities may track the status of the items through various different databases that are not necessarily interconnected with each other. Different terminology may be used to track the items in each database. An expert user can perform a workflow analysis of the lifecycle of the items, and map out how each item is tracked in the various databases, including by determining database tables that are used by each database to track each of the items. After determining which database tables are used to track each of the items, the expert user can set forth the database table names and column headings that are used in each of the various databases to track the items. (For example, a column heading may specify that an item is a turbine engine. In such a case, the rows of these database tables will then include different turbine engine items.)

Because there may be information in different physically disparate databases that has one or more shared or common linkages, the present technique, allows for this different information to be unified together in the form of a search query from a user interface.

The system 120 allows for configuration, definition of connectors, generation of connections, search queries, and finding and returning search results, as detailed below with respect to FIG. 2.

Figure 2:
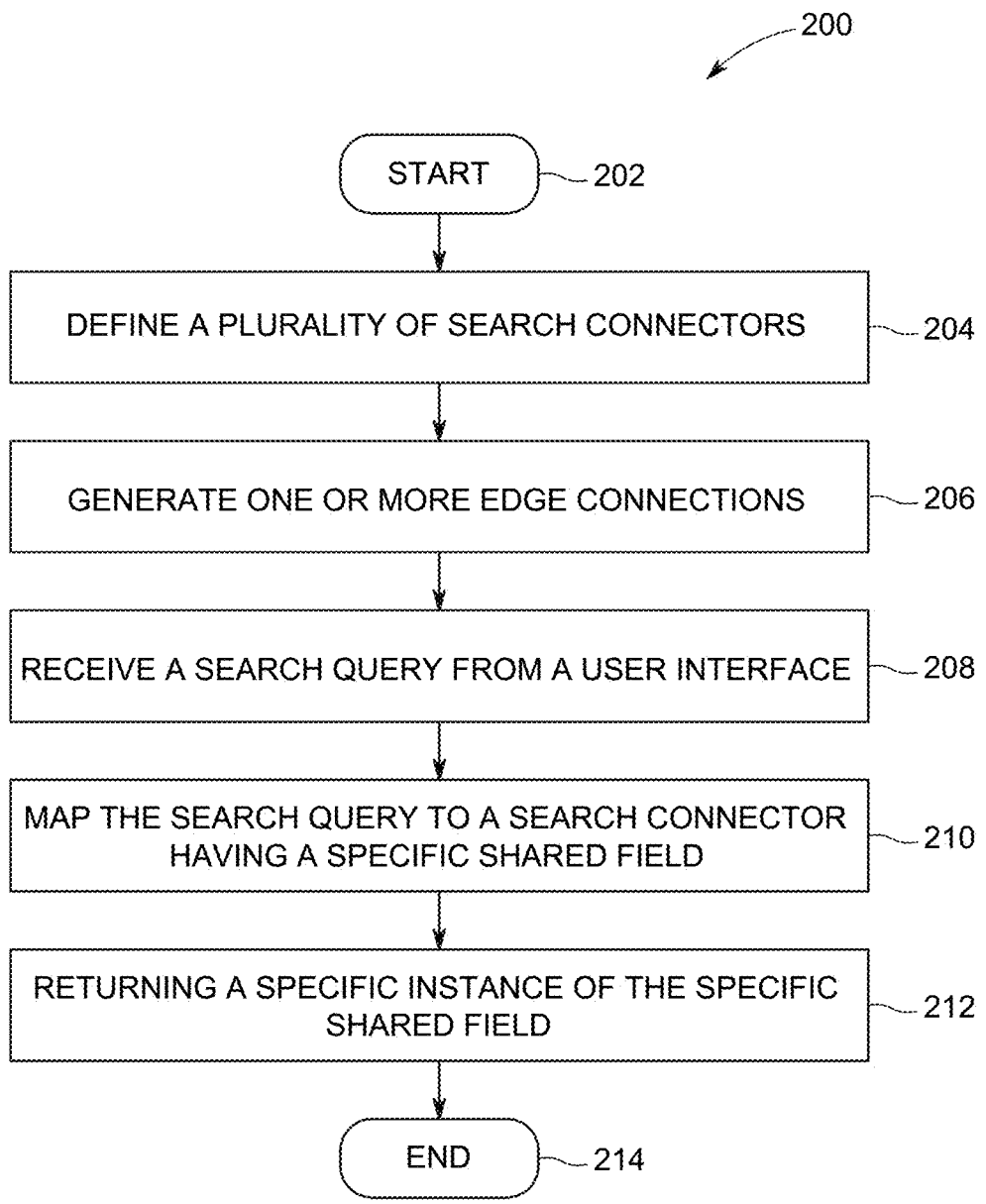
FIG. 2 is a flow diagram of an example method of searching databases.

FIG. 2. is a flow diagram of an example database search method 200. In the embodiment of FIG. 2, at block 204 a plurality of search connectors are defined between the first database and the second database. For example, the search connectors may be defined by automatically analyzing the database configuration files of each of the first and second databases to identify shared field names, that are indicative that the data related to the same virtual or physical items is represented in each of the first and second databases. In another example, an expert user may determine that a shared field is a column heading that is present in one or more database tables, and the configuration file can identify the column heading of each database table as being related. The plurality of search connectors may include at least one search connector having a shared field of the first database 111 (FIG. 1) and the second database 112 (FIG. 1). The definition of the search connectors may include the specification of a graph of business entities, e.g., a set of business entities annotated with a set of connections linking some entities to other entities. For example a first business entity may store information in the first database 111 (FIG. 1), and a second business entity may store information in the second database 112 (FIG. 1). The connections may represent business links, such as purchases, sales, installations, servicing, etc. Connections may be in the form of physical connections, such as through the network 102, linking together disparate data sets stored on the databases 111, 112 (FIG. 1).

In one embodiment, at block 204 a different database configuration file may be used for each of the databases. For example, database configuration files may be automatically generated by determination of the database type and the row and column names of the database. In such a case, the configuration files may include a view name and a column list. The view name and columns may be defined in each of the configuration files in a different manner, depending on the underlying technology of the individual database. For example, the first database 111 (FIG. 1) may have a differently formatted configuration file than the second database 112 (FIG. 1). Thus, the configuration files create a linkage between the different databases through the shared model parameters, such as the views or columns. In operation of the method 200, data may be imported corresponding to the view names, columns, tables, rows, etc., from the databases on an ongoing basis, so that the data is available for future queries without having to wait for the underlying databases to be queried. On the other hand, the importing process may be configured on an as needed basis. In another example, at block 204 the search connectors may be specified in accordance with a business taxonomy that organizes data according to business processes or logistics information, which may be stored in the configuration files. For example, an expert user may match the business taxonomy that is used to organize the data with the different databases to identify shared fields between the databases.

Examples of the data stored in configuration files include the column names of the different databases. For example, a contract SQL database may include the columns set forth in Table 1 below:

TABLE 1

| Columns for Database: CONTRACT_MASTERDATA |
| --- |
| HEADER_ID |
| LINE_ID |
| LINE_NUMBER |
| CONTRACT_NUMBER |
| PARENT_JOB |
| PARENT_JOB_NAME |
| JOB_NUMBER |
| CUSTOMER_NAME |
| CUSTOMER_COUNTRY_CODE |
| CUSTOMER_COUNTRY |
| END_CUSTOMER_NAME |
| END_CUSTOMER_COUNTRY_CODE |
| END_CUSTOMER_COUNTRY |
| INSTALLATION_COUNTRY_CODE |
| INSTALLATION_COUNTRY |
| INSTALLATION_LOCATION |
| RAC_DATE |
| START_DATE |
| PLANT |
| PURCHASE_ORDER_DATE |
| CONTRACTUAL_DELIVERY_DATE |
| PROJECT_ENGINEER |
| PROJECT_MANAGER |
| PROJECT_PLANNER |
| IQM |
| PQM |
| ROW_NUMBER_IN_GROUP |
| LAST_UPDATED_DATE |
| PARTITION_CRITERIA |

And, a purchase order database may include the columns set forth in Table 2 below:

TABLE 2

Columns for database: PURCHASE_ORDERS

DISTRIBUTION_NUM
RELEASE_NUM
AUTHORIZATION_STATUS
JOB_NUMBER
UNIT_OF_MEASURE
PO_DISTRIBUTION_ID
SHIPMENT_NUM
RATE
INT_SOURCE_CODE
PO_DISTR_QUANTITY
PO_DISTR_QUANTITY_CANC
REQ_LINE_QUANTITY
UNIT_PRICE
LIST_PRICE_PER_UNIT
PRICE_OVERRIDE
FUNCTIONAL_SHIP_AMOUNT
EXTENDED_LIST_PRICE
DUMMY_CODE
PO_SCHEDULE_SOURCE
VENDOR_CODE
VENDOR_NAME
ORDER_TYPE
PO_NUMBER
CREATION_DATE
APPROVED_DATE
POR_NUMBER
PROMISED_DATE
CONTRACTUAL_DATE
LINE_NUM
ITEM_CODE
ITEM_DESCRIPTION
CURRENCY_CODE
PRODUCT_CODE
PDA_RATE
REQ_LINE_UNIT_PRICE
REQ_LINE_RATE
PO_LINE_LOC_APPROVED_DATE
LINE_LOCATION_ID
REVISION_NUM
FIRST_APPROVED_DATE
POR_UNIT_PRICE
MARKET_PRICE
ITEM_CATEGORY
EC_IC_COMP_BID
STRING_NPI_OUT
ITO_CODE
SHIPMENT_CANCELLED
REQ_LINE_CANCELLED
ORG_ID
NAME
ORGANIZATION_CODE
ORGANIZATION_NAME
PARTITION_CRITERIA
LAST_UPDATED_DATE
BUYER_NAME

In the examples of Tables 1 and 2, configuration files may relate different columns to each other. For example, these sources may be connected via common keys. For example, SUPPLIER_CODE may be mapped to VENDOR_CODE, etc.

Continuing with the embodiment of FIG. 2, at block 206 one or more edge connections are algorithmically generated between the first database and the second database using the at least one search connector. For example, the first database may have a first database table with a column that identifies an item identifier (e.g., a unique identification of a given product), and the second database may have a second database table with another column that also identifies the same item identifier in common with the column of the first database table of the first database. In such an example, the common column header is an example of a shared field between the first and second databases. An expert user may have previously identified the common column identifier, and stored this relationship in a configuration file as a search connector. Continuing with this example, rows of the first database table (which include the common column header) could potentially be matched with one or more rows of the second database table, based on the same value appearing in the common column. The matched rows may be considered instances of the shared field in the first database and the second database. By way of further explanation, and at a higher level of abstraction that the specific database example given above, the search connectors may represent a general category of interest, for example a product model number, and the edge connections may represent specific products, for example a specific item of the product model number that was manufactured, identified by a specific serial number. In another example, a search connector may connect customer orders for specific services, and an edge connection may represent specific orders, e.g., by order number. An edge connection can be, for example, a unique identifier or a serial number of a product that appears in more than one database.

Once the search connectors are defined at block 204 e.g., in terms of a business taxonomy, a set of all edge connections affiliating the elements of the business taxonomy with the business entities may be algorithmically created, representing edge connections between the business entities labeled with business process or logic. For example, the business entities may be each affiliated with one of the databases 111, 112 (FIG. 1).

Next, the method 200 at block 208 receives a search query from a user interface. In such a case, the method 200 at block 208 may receive a natural language search query from the user, which does not include any specific designation of database structure. Other types of queries are also possible. Numerous users may access the method 200 from different computer systems at the same time, and submit their queries. Support of a natural language query offers the benefit of allowing less sophisticated users to perform searches. More advanced, structured queries may also be supported as needed to provide an expert interface, if desired.

In one example, a natural language query may allow a user to search on the phrase "INVOICES AZVALVES" which is parsed to return all the invoices of supplier AZVALVES, because the method 200 has been configured in the context of searching invoices. Other examples of natural language queries may use the following words to indicate an appropriate field to be searched: order; revenues; issues; and contacts. In one example, natural language parsing may include analysis of the search query string with respect to a formal grammar, to identify keywords and verbs to identify relationships in the query string. For example, a query such as "return all invoices for widgets sold to AZVALVES" may be parsed to identify business taxonomy terms of "invoice" and "sold," a product category of "widgets," a customer name of "AZVALVES" and a command term of "return." Other parsing methodologies such as keyword or keyphrase extraction may focus on specified words.

In addition, at block 210 the search query can be mapped (e.g., through the identification of keywords as shared fields or column names) to one of the plurality of search connectors having a specific shared field. For example, the method 200 at block 210 may translate a natural language search query using the defined plurality of search connectors. The connectors are then identified and linked together to track, for example, items through a manufacturing process, sales process, etc.

By way of specific example of one embodiment of mapping the search queries at block 210, a search connector may be defined as a product ID that represents a specific product, such as a model ABC widget. In such a case, the edge connections may be generated as each set of information shared between the databases for a specific instance of the model ABC widget, e.g., through the serial numbers of the individual model ABC widgets. Continuing with this example, a natural language query of "show all ABC widgets with feature Z having serial numbers between X and Y that had two or more defects that were sold in 2018" may be entered by a non-expert user. Next, the query may be parsed to identify the search connector of specific products, namely model ABC widgets. Next, the edge connections generated for model ABC widgets may be narrowed by serial number, defect information, and selling date. In such a case, the feature information, defect information, and selling date may each have been originally stored in a different database. Because the search connector was defined for ABC widgets, and the different databases may be keyed to the serial number, all the information is available to be the database search system, instead of requiring three different queries to three different databases.

Further, at block 212 a specific instance of the specific shared field may be returned to the user. For instance, with respect to the example of ABC model widgets discussed above, specific instances may include specific widgets identified by serial numbers, which may be returned along with other salient information, such as the feature information, defect information, selling date, price, etc. In other examples, the specific instances may be a list of products that were manufactured in one factory, along with defect data affiliated with the products. The connections and graphs may be navigated or viewed through a user interface by the user 104 (FIG. 1) to provide a free-form navigation.

Figure 3:
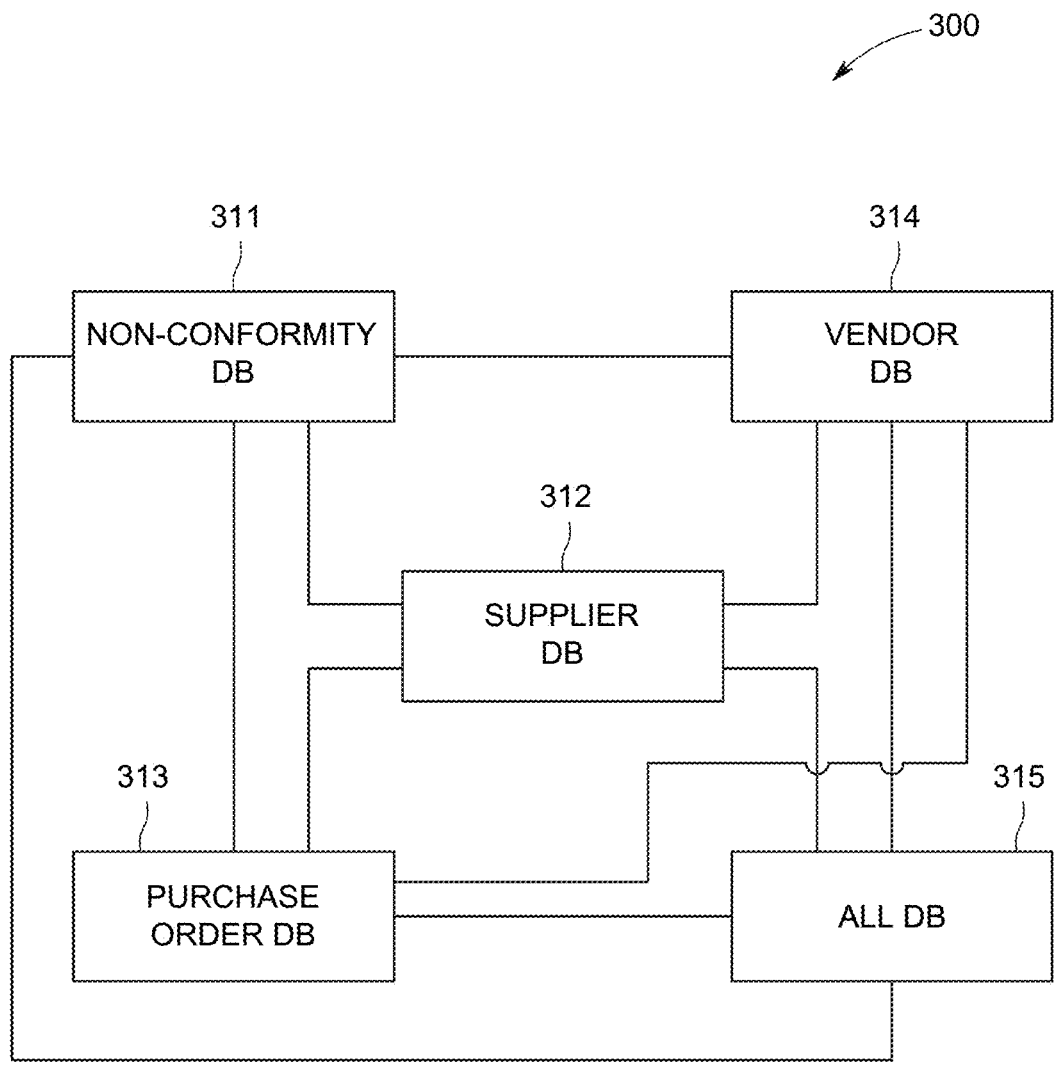
FIG. 3 depicts an example set of connectors defined between databases.

By way of example, FIG. 3 depicts an example set of connectors 300 (denoted as lines between the boxes) defined between databases 311-315. In the embodiment of FIG. 3, each of the five databases 311-315 are connected to all four other databases 311-315. However, in another example, the databases may not be completely connected. For instance, the connectors 300 may be related to products. The non-conformity database 311 may include information about manufacturing issues encountered during the fabrication of the products. The supplier database 312 may include information about which suppliers supplied each subcomponent of the products. The purchase order database 313 may track the customers who purchased and received each of the products. The vendor database 314 may track the vendor who sold, installed, and/or provisioned the products. A fifth, all-database 315 may include further information about the products.

In this example, the connectors 300 include specific tables, views, columns, etc., that identify the products under consideration inside the schema of each of the databases 311-315. Once the connectors 300 have been defined, the method 200 of FIG. 2 may be used to import all relevant data from each of the databases 311-315, and subsequent queries, such as natural language queries, can have access to the this data, and provide insight into the entire lifecycle of a product, from manufacturing, including sub-components, to purchase and installation.

In another example, an issue, such as a manufacturing issue, may be discovered on a specific machine part. In such a case, the method may be used to determine which machines have the part with the issue, and ascertain whether the machines are still operating, and if so, the customer locations of operations. In a further example, a corrective action may be deployed for a process, and then subsequently audited to determine the efficacy of the corrective action.

By way of overview, a set of working examples are next described with respect to FIGS. 4-9. For instance, three different databases, e.g., databases 111-113 of FIG. 1) may include information relevant to resolution of a supplier delay problem. In the example of FIG. 4-9, data has been integrated from three different databases, a delivery database 901 of FIG. 9, a supplier database 902 of FIG. 9, and a manufacturing database 903 of FIG. 9.

After configuration of the delivery database 901, the supplier database 902 and the manufacturing database 903 into the search engine system 120 (FIG. 1), root cause analysis of the supplier delay problem proceeds beginning with FIG. 4.

FIG. 4 depicts a delivery report user interface 400. The delivery user interface 400 displays a number of rows, such as rows 432-435, which provide detailed information about a number of deliveries. The information about the deliveries is defined in the form of a number of columns, such as columns 411-420.

In the example of FIG. 4, the columns 411-420 include:
a shipment number column 411;
a supplier name column 412;
an item identifier column 413;
a product code column 414;
an item description column 415;
a days-late (need) column 416;
a team leader column 417;
a supplier contact column 418;
a project identifier column 419; and
a days-late (contractual) column 420.

A user of the user interface 400 selects a row, such as row 432, in which column 416 indicates 26 days late versus need, and column 420 indicates 107 days late against contractual obligation. By selecting the row, the user may initiate a search query from the user interface 400, which may be received by the search engine system 120 (FIG. 1). In turn, the search engine system 120 receives the search query (e.g., at block 208 of the method 200 of FIG. 2), and maps the search query based on the shared fields between the three databases 111-113 (FIG. 1). The goal of the searching may be to determine what caused the delays indicated in the delivery of the row 432.

Figure 5:
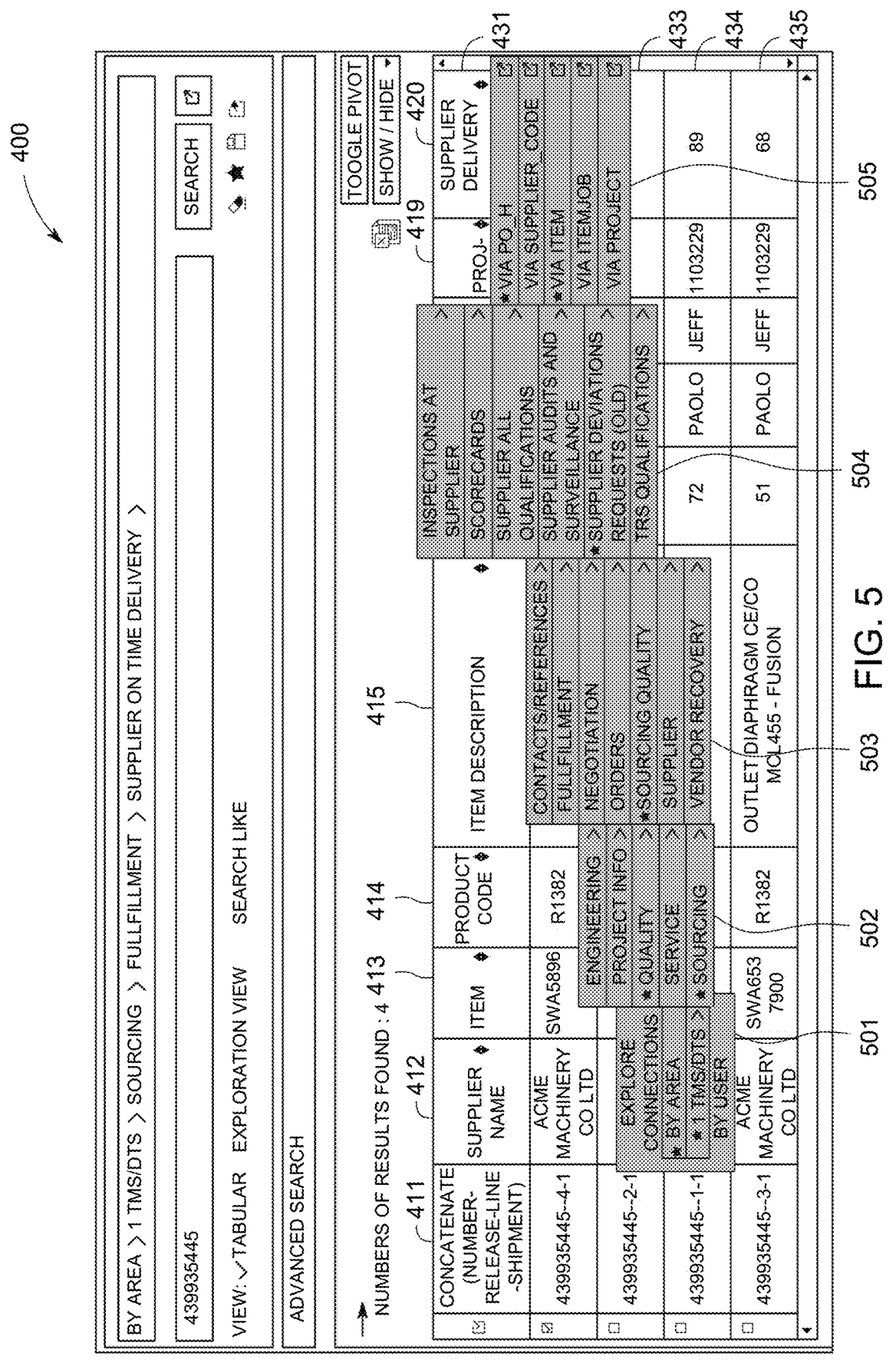

Turning next to FIG. 5, the search query may be mapped (e.g., at block 210 of the method 200 of FIG. 2) to search connectors. An explore connections menu 501 allows a user to explore connections by area or by user. Upon selection of exploring connections by an area labeled "1 TMS/DTS" in the menu 501, "sourcing" in the area menu 502, "sourcing quality" in the sourcing menu 503 and "supplier deviations requests (old)" in the sourcing quality menu 504, the user is presented an option in a selection menu 505 to navigate to the selected data, sorted by a variety of options (purchase order, project, supplier code).

After the selection of "via project" in the selection menu 505, the user is presented a supplier deviation user interface 600 of FIG. 6. The user interface 600 displays the supplier deviations that are related to the delivery of the row 432 (FIG. 4), for inspection by the user. The supplier deviation user interface 600 includes deviations in rows 632-634, for which information is defined by columns 611-618. In the example of FIG. 6, the columns 611-618 include:
a deviation description column 611;
an identification column 612;
a component description column 613;
a quality signature date column 614;

a supplier quality engineer name column 615;
a supplier name column 616;
an NCR number column 617; and
a disposition column 618.

Figure 7:
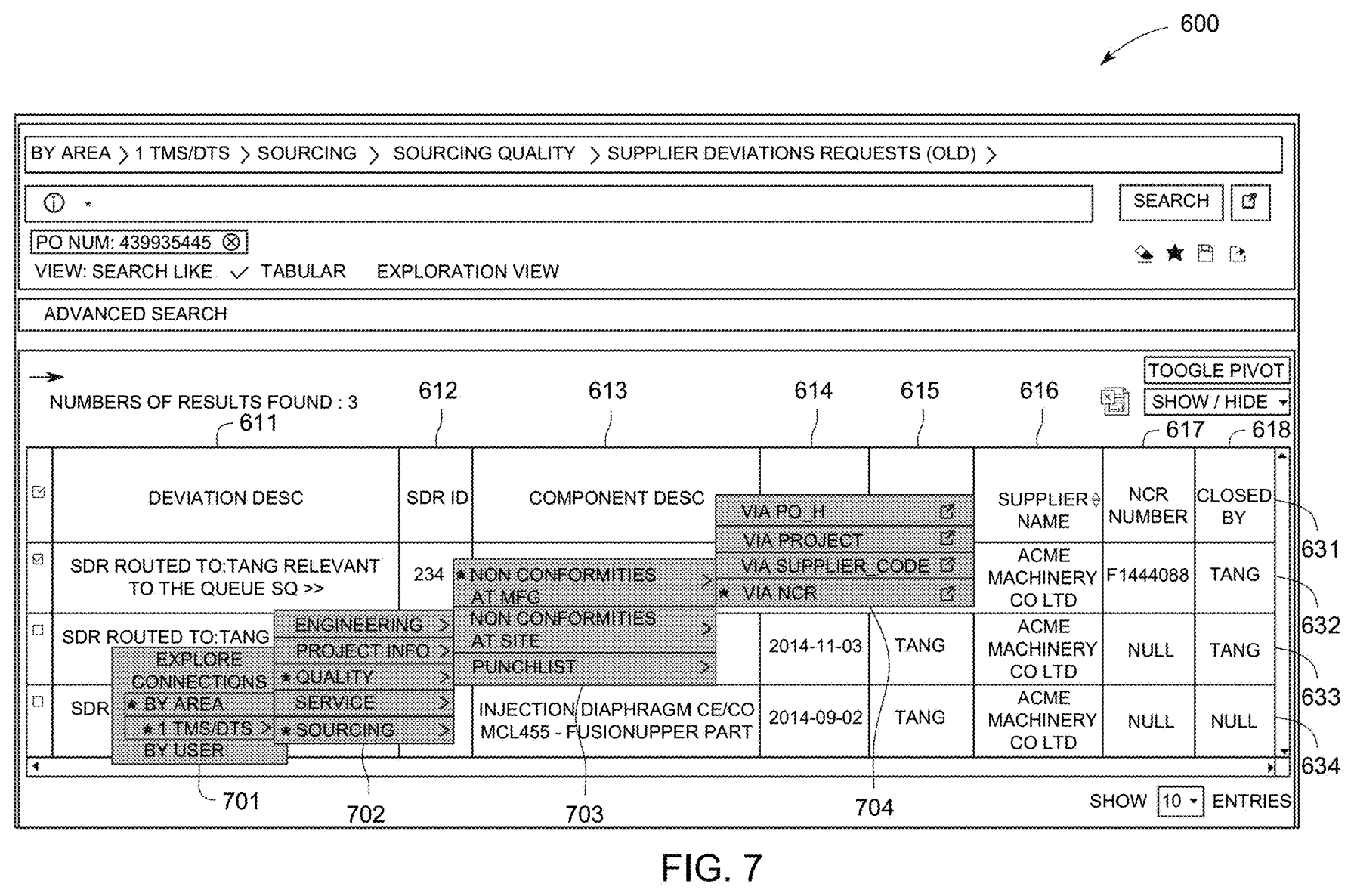

Turning to FIG. 7, a user of the user interface 600 selects a row, such as row 632, for further analysis, using the menus 701-704. For instance, upon selection of "1 TMS/DTS" in the exploring connections menu 701, "quality" in the area menu 702 and "non-conformities at manufacturing" in the quality menu 703, the user is presented an option in a selection menu 705 to navigate to the selected data, sorted by a variety of options.

As depicted in FIG. 8, a manufacturing non-conformities user interface 800 is presented to the user. The user interface 800 includes non-conformities in rows 832-834, for which information is defined by columns 811-818. In the example of FIG. 8, the columns 811-818 include:
a number column 811;
an initiation data column 812;
a deviation description column 813;
a deviation code column 814;
a part number column 815;
a part identifier column 816;
a project number column 817; and
a supplier name 818.

The user may then view details of the row 832 deviation, as indicated in information box 840. The information box 840 explains that a coding error had taken place, in which the wrong serial number (540901A in the example of FIG. 8) was selected initially, and later corrected.

The example of FIGS. 4-8 thus leads to the root cause of the supplier deviation noted on the row 432 of FIG. 4 being the coding error found in the information box 840.

Figure 9:
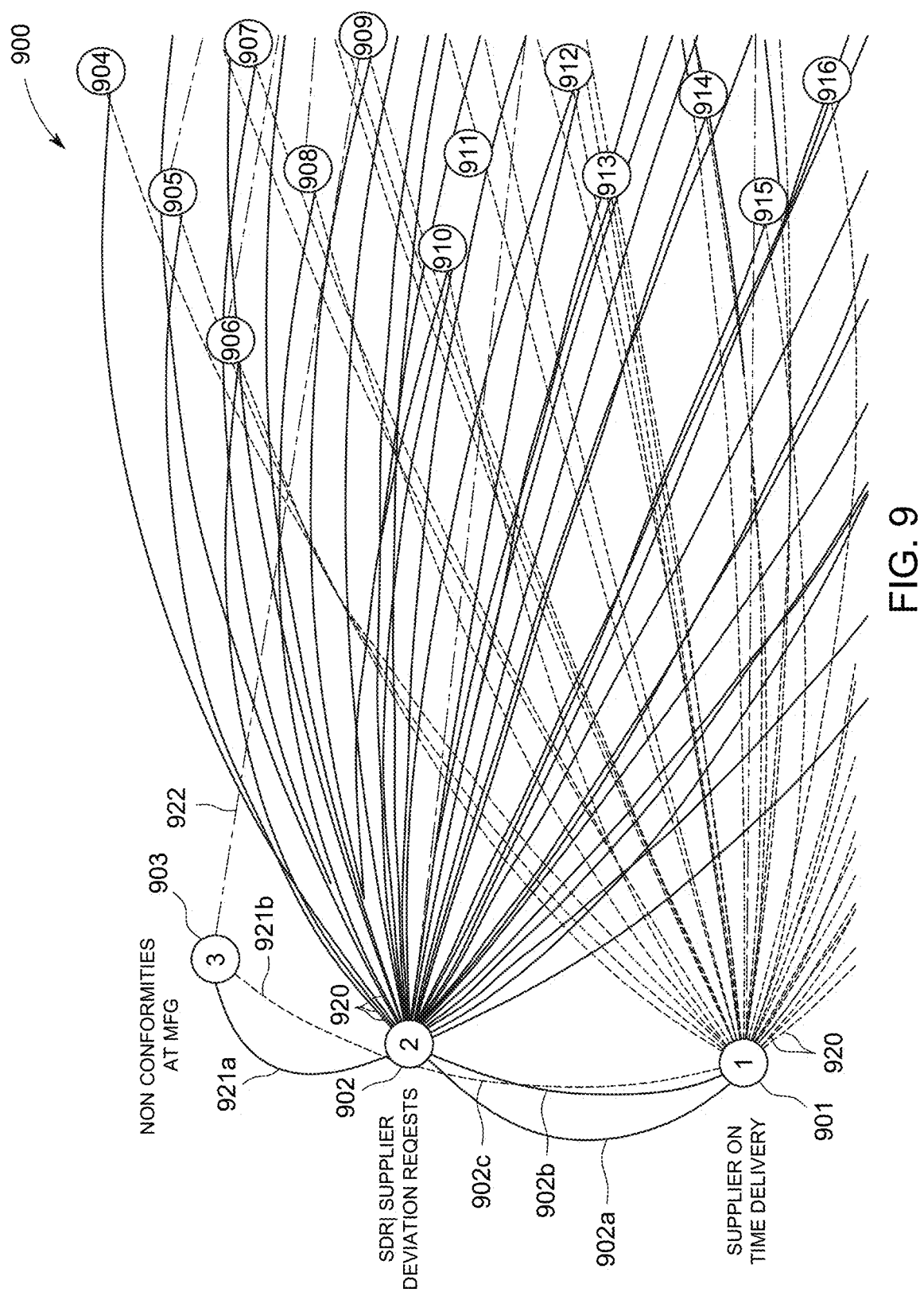
FIG. 9 depicts search connectors.

FIG. 9 provides details of how search connectors are used to link together the three databases. In the example of FIG. 9, search connectors 920, 920a-920c, 921a, 921b and 922 are used to connect together databases 901-903. Different edge connections 904-916 combine information from the databases with which they are connected, by tracing commonly shared identifiers, such as those noted above with respect to FIGS. 4-8, including columns 411-420, columns 611-618 and columns 811-818.

The drill down described above in, e.g., menus 501-505 and 701-704 is representative of a business taxonomy. Another example of a business taxonomy defines the relationship between buyers and service engineers in a turbomachinery business in a hierarchy as follows:
 a. By user>Turbomachinery Business>Buyer>Purchase Orders
 b. By user>Turbomachinery Business>Buyer>Supplier Activation by Site
 c. By user>Turbomachinery Business>Service Engineering>Non-conformities at Site
 d. By user>Turbomachinery Business>Service Engineering>Global Installed Base Although the techniques set forth herein have been described with respect to specific usages, such as the tracking of supply chain information of a product, the method may be used in any situation in which multiple databases include slices of data related to the same item(s). Thus, the specific example embodiments are meant only to explain the technique, not limit the technique.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

This written description uses examples to disclose embodiments of the invention, including the best mode, and also to enable any person skilled in the art to practice embodiments of the invention, including making and using any devices or systems and performing any incorporated methods. The patentable scope of embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of searching a plurality of databases comprising at least a first database, a second database and a third database, the method comprising:
 defining a plurality of search connectors between the first database, the second database and the third database, the plurality of search connectors comprising at least one first search connector having at least one shared field of the first database and the second database linking the first database and the second database together, at least one second search connector having at least one shared field of the first database and the third database linking the first database and the third database together, and at least one third search connector having at least one shared field of the second database and the third database linking the second database and the third database together;
 generating a plurality of edge connections, wherein each of the plurality of edge connections is connected to one or more of the plurality of databases and combines information from said one or more of the plurality of databases by tracing commonly shared fields relative to each of the plurality of databases;
 receiving a search query from a user interface;
 mapping the search query to one of the plurality of search connectors having a specific shared field; and
 returning a specific instance of the specific shared field, the specific instance being one of the one or more edge connections between two or more of the plurality of databases.

2. The method of claim 1, wherein receiving the search query comprises receiving a natural language search query and mapping the search query comprises translating the natural language search query using the defined plurality of search connectors.

3. The method of claim 1, wherein defining the plurality of search connectors comprises using a first database configuration file for the first database, the first database configuration file comprising a view name and a column list, and a second database configuration file for the second database, the second database configuration file comprising at least the view name.

4. The method of claim 3, further comprising importing data corresponding to the view name of the first database configuration file and the second database configuration file.

5. The method of 1, further comprising importing a first table from the first database and a second table from the second database.

6. The method of claim 1, wherein one of the first database and the second database comprises a standard query language (SQL) database.

7. The method of claim 1, wherein the first database is of a first database type and the second database is of a second database type, the first and second database types being different database types.

8. The method of claim 1, wherein the first database operates on a first server and the second database operates on a second server.

9. A database search system comprising:
 a computer;
 a network connection to the computer providing user access to a plurality of databases comprising at least a first database, a second database and a third database;
 a plurality of search connectors between the first database, the second database and the third database, the plurality of search connectors comprising at least one first search connector having at least one shared field of the first database and the second database linking the first database and the second database together, at least one second search connector having at least one shared field of the first database and the third database linking the first database and the third database together, and at least one third search connector having at least one shared field of the second database and the third database linking the second database and the third database together;
 a plurality of edge connections, wherein each of the plurality of edge connections is connected to one or more of the plurality of databases and combines information from said one or more of the plurality of databases by tracing commonly shared fields relative to each of the plurality of databases; and a user interface connected to the computer with which a user performs a search query, wherein the database search system maps the search query to one of the plurality of search connectors having a specific shared field and returns a specific instance of the specific shared field, the specific instance being one of the one or more edge connections between two or more of the plurality of databases.

10. The database search system of claim 9, wherein the search query comprises a natural language search query and the database search system translates the natural language search query using the defined plurality of search connectors.

11. The database search system of claim 9, wherein the database search system defines the plurality of search connectors comprises using a first database configuration file for the first database, the first database configuration file comprising a view name and a column list, and a second database configuration file for the second database, the second database configuration file comprising at least the view name.

12. The database search system of claim 11, wherein the database search system imports data corresponding to the view name of the first database configuration file and the second database configuration file.

13. The database search system of claim 12, wherein the database search system imports a first table from the first database and a second table from the second database.

14. The database search system of claim 9, wherein one of the first database and the second database comprises a standard query language (SQL) database.

15. The database search system of claim 9, wherein the first database is of a first database type and the second database is of a second database type, the first and second database types being different database types.

16. The database search system of claim 9, wherein the first database operates on a first server and the second database operates on a second server.

* * * * *